Figure 1:
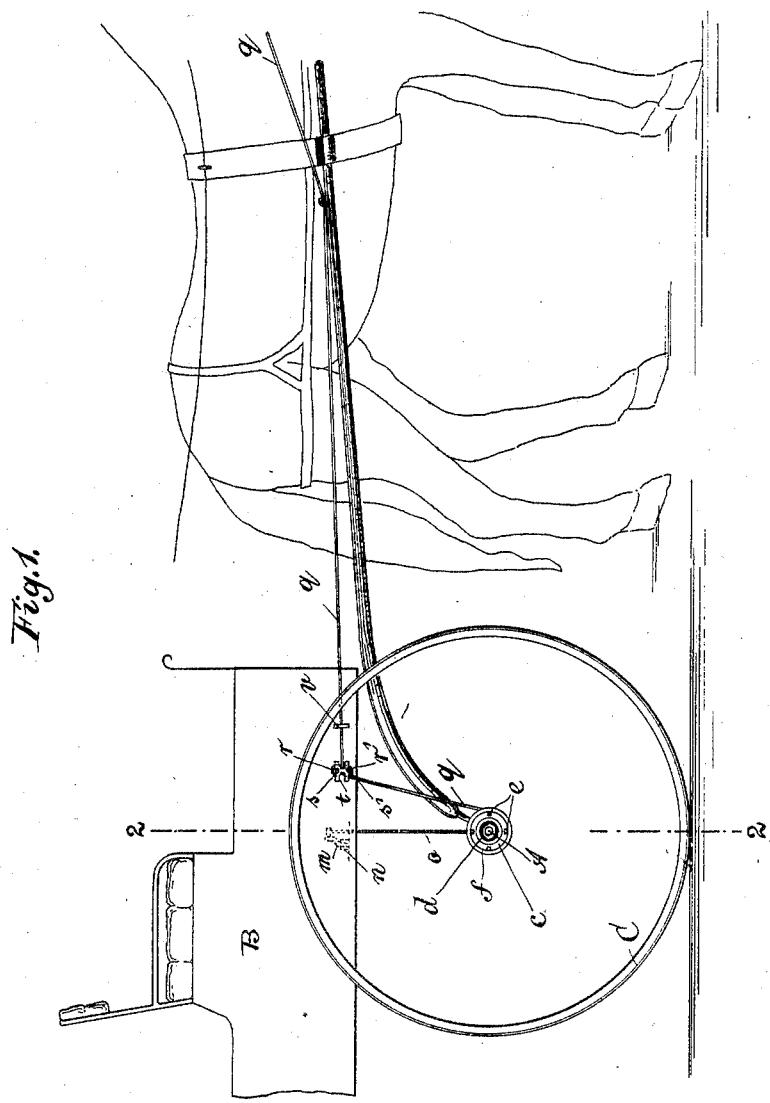

No. 776,766. PATENTED DEC. 6, 1904.
B. VIOLA & J. ERDÉLYI.
DEVICE FOR STOPPING VEHICLES.
APPLICATION FILED SEPT. 21, 1903.
NO MODEL. 2 SHEETS—SHEET 1.

Witnesses:
John A. Paulson
M A Helmke

Inventors
Bartholomew Viola
John Erdélyi
by Schreiter & Mathews
their Att'ys

No. 776,766. PATENTED DEC. 6, 1904.
B. VIOLA & J. ERDÉLYI.
DEVICE FOR STOPPING VEHICLES.
APPLICATION FILED SEPT. 21, 1903.
NO MODEL. 2 SHEETS—SHEET 2.
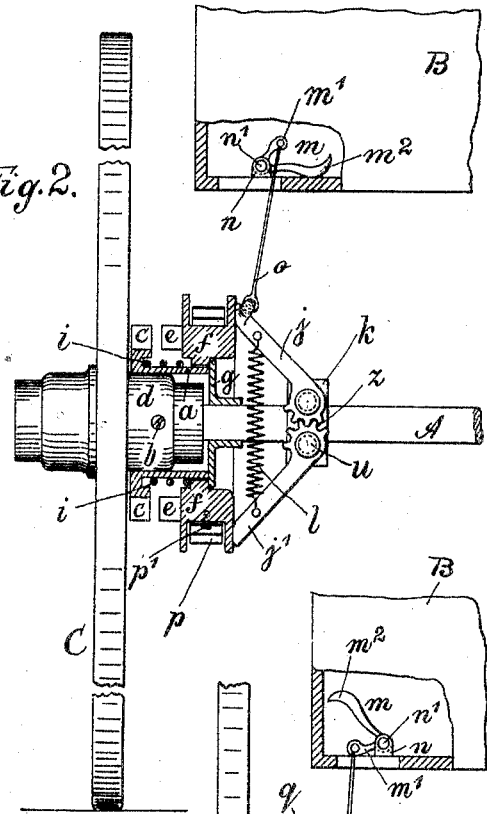
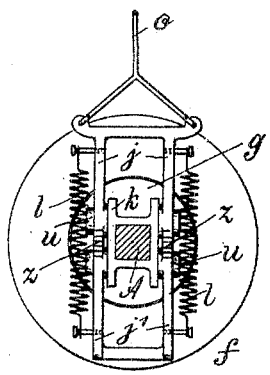
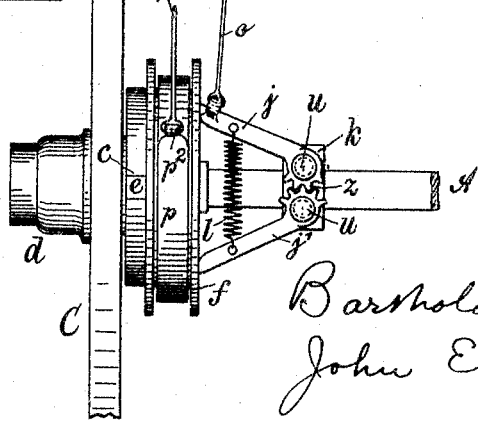

No. 776,766. Patented December 6, 1904.

UNITED STATES PATENT OFFICE.

BARTHOLOMEW VIOLA AND JOHN ERDÉLYI, OF NEW YORK, N. Y.

DEVICE FOR STOPPING VEHICLES.

SPECIFICATION forming part of Letters Patent No. 776,766, dated December 6, 1904.

Application filed September 21, 1903. Serial No. 174,111. (No model.)

*To all whom it may concern:*

Be it known that we, BARTHOLOMEW VIOLA and JOHN ERDÉLYI, of the borough of Brooklyn, county of Kings, city and State of New York, have invented certain new and useful Improvements in Devices for Stopping Vehicles, of which the following is a full, clear, and exact description, reference being had to the accompanying drawings, wherein—

Figure 1 is an elevation of the front part of a vehicle provided with our improved stopping device. Fig. 2 is a sectional view on line 2 2 indicated in Fig. 1 looking to the left. Fig. 3 is a similar view like Fig. 2, showing the device in action; and Fig. 4 is a front view of the lever mechanism operating the stop-collar.

Our invention relates to vehicles; and it consists of the hereinafter more fully described device for stopping a vehicle in case of runaways or breaking of the reins.

This stopping device is preferably applied on the front-wheel axle of the vehicle and is operated in connection with one or both of the front wheels. It comprises, essentially, a sleeve $a$, having a serrated flange $c$ secured to the hub $d$ of the vehicle-wheel C by means of screws $b$; a collar $f$, set loosely upon the sleeve and having projections $e$ fitted to engage with the serrated flange $c$; mechanism for shifting the collar $f$ (hereinafter referred to as the "stop-collar") on the sleeve $a$, so as to bring its projections $e$ in and out of engagement with the recesses in the serrated flange $c$, and means for connecting the stop-collar with some stationary part of the vehicle, preferably the body thereof, and with the bridles of the horses drawing the vehicle.

The mechanism for shifting stop-collar $f$ on the sleeve $a$ consists of spiral spring $i$, coiled on sleeve $a$ between the flange thereof and collar $f$ and set to push collar $f$ out of engagement with the flange $c$; of the spring-actuated levers $j$ and $j'$, geared together at $z$ and pivoted by pivots $u$ to block $k$, which is rigidly secured to the axle A of the vehicle; of springs $l$ or some other means for drawing levers $j$ and $j'$ together; of line $o$ and lever $m$ or of some other means for drawing levers $j$ and $j'$ apart and holding them in that position while the device is not in use. Stop-collar $f$ is set to loosely revolve on the sleeve $a$ and is held thereon against the action of spring $i$ by disk $g$, secured to axle A, as shown in Fig. 2 of the drawings. Spring $i$ is weaker than springs $l$ and acts upon collar $f$ to disengage it from flange $c$ when levers $j$ and $j'$ are withdrawn. In the form of our improved device as shown in the drawings these means for drawing and holding apart levers $j$ and $j'$ consist of lever $m$, pivoted in lug $n$, secured to the body B of the vehicle, and a rope or connecting-rod $o$, connecting its shorter arm $m'$ with the free ends of lever $j$. The longer arm $m^2$ rests upon the bottom of the carriage and is so shaped that it may be manipulated by hand or foot. The arms of lever $m$ are disposed relatively to each other at an angle less than ninety degrees, (90°,) the fulcrum-point of the lever being the apex of the angle and coinciding with the pivot $n'$ set in the lug $n$, whereon the lever turns. When in the position shown in Fig. 2, the shorter arm $m'$ of lever $m$ lies inwardly from the fulcrum-point and toward the arm $m^2$. Therefore the pull of rope $o$ (drawn by springs $l$, tending to draw levers $j$ and $j'$ together) is transferred to arm $m^2$, resting against the bottom of the vehicle, and tends to hold the lever $m$ in this normal position of the device. When arm $m^2$ is so lifted, the connecting-point between arm $m'$ and rope $o$ is moved to the other side of the fulcrum-point of lever $m$ and the action of springs $l$ completes the turn of lever $m$ into the position shown in Fig. 3, at the same time contracting and drawing together levers $j$ and $j'$. This sets the device in action instantaneously. These levers $j$ and $j'$ turning on their pivots $u$ act against the stop-collar $f$, pushing it (against the resistance of spring $i$) toward the serrated flange $c$, and as quickly as the recessed portions of this flange are brought in opposition to the projecting parts $e$ of the stop-collar this stop-collar becomes fixed to the sleeve $a$ and is made to revolve with the wheel.

The device for connecting the stop-collar $f$ with the bridles of the horses consists of a coiled spring $p$, one end whereof is connected at $p'$ to the collar $f$ and the other end whereof, $p^2$, is connected to line $q$, drawn between grooved rolls $r$ and $r'$, and connected (independently of the reins) with the bridles of the horses. Rolls $r$ and $r'$ are set to loosely revolve on studs $s$ and $s'$, pillowed in bearings $t$, secured to the body B of the vehicle.

When the device is set in action as above explained, the coils of spring $p$, which are normally loosely disposed around collar $f$, begin to contract, and thereby to exert a pull on line $q$, producing the same effect upon the horses as if they be strongly and steadily pulled up by the driver. This pull is so hard and so steady that in most instances it will stop the horses. It continues until stop-ball $v$ abuts against the bearings of rolls $r$ and $r'$. At this point the coils of spring $p$ are closely wound around collar $f$, acting as a brake, finally stopping the rotation of the front wheels of the carriage. In this manner at the same time while the horses are checked the load on them is increased and the progress of the vehicle retarded. If the horses have not stopped running, then they must inevitably fall.

We claim as our invention—

1. A device for stopping vehicles, comprising a sleeve having a serrated flange, secured to the wheel of the vehicle; a collar set loosely upon the sleeve and having projections in position to engage with the serrated flange of the sleeve; a spring loosely coiled upon the collar and having one end connected thereto; means for connecting the other end of the spring with the body of the vehicle and with the bridles of the horses; and mechanism for shifting the collar upon the sleeve in and out of engagement with the serrated flange thereof.

2. A device for stopping vehicles, comprising a sleeve having a serrated flange, secured to the wheel of the vehicle; a collar set loosely upon the sleeve and having projections in position to engage with the serrated flange of the sleeve; a spring loosely coiled upon the collar and having one end connected thereto; means for connecting the other end of the spring with the body of the vehicle and with the bridles of the horses; a spring set between the flange of the sleeve and the collar, a block affixed to the axle of the vehicle; a set of levers fulcrumed to the block and engaging with their free ends the collar; springs set to press the levers upon the collar, to move it in engagement with the serrated flange of the sleeve; and means for removing the levers in opposite direction and for holding them in position against the action of the springs.

3. A device for stopping vehicles, comprising a sleeve having a serrated flange, secured to the wheel of the vehicle; a collar set loosely upon the sleeve and having projections in position to engage with the serrated flange of the sleeve; a spring loosely coiled upon the collar and having one end connected thereto; means for connecting the other end of the spring with the body of the vehicle and with the bridles of the horses; a spring set between the flange of the sleeve and the collar, a block affixed to the axle of the vehicle; a set of levers fulcrumed to the block and geared together, and engaging with their free ends the collar; springs set to press the levers upon the collar, to move it in engagement with the serrated flange of the sleeve; a lug secured to the body of the vehicle, a lever fulcrumed in the lug; means for connecting the lever with the levers bearing on the collar, and means for holding the lever in position.

BARTHOLOMEW VIOLA.
JOHN ERDÉLYI.

Witnesses:
JOHN A. PAULSON,
M. A. HELMKE.